United States Patent Office 3,299,348
Patented Jan. 17, 1967

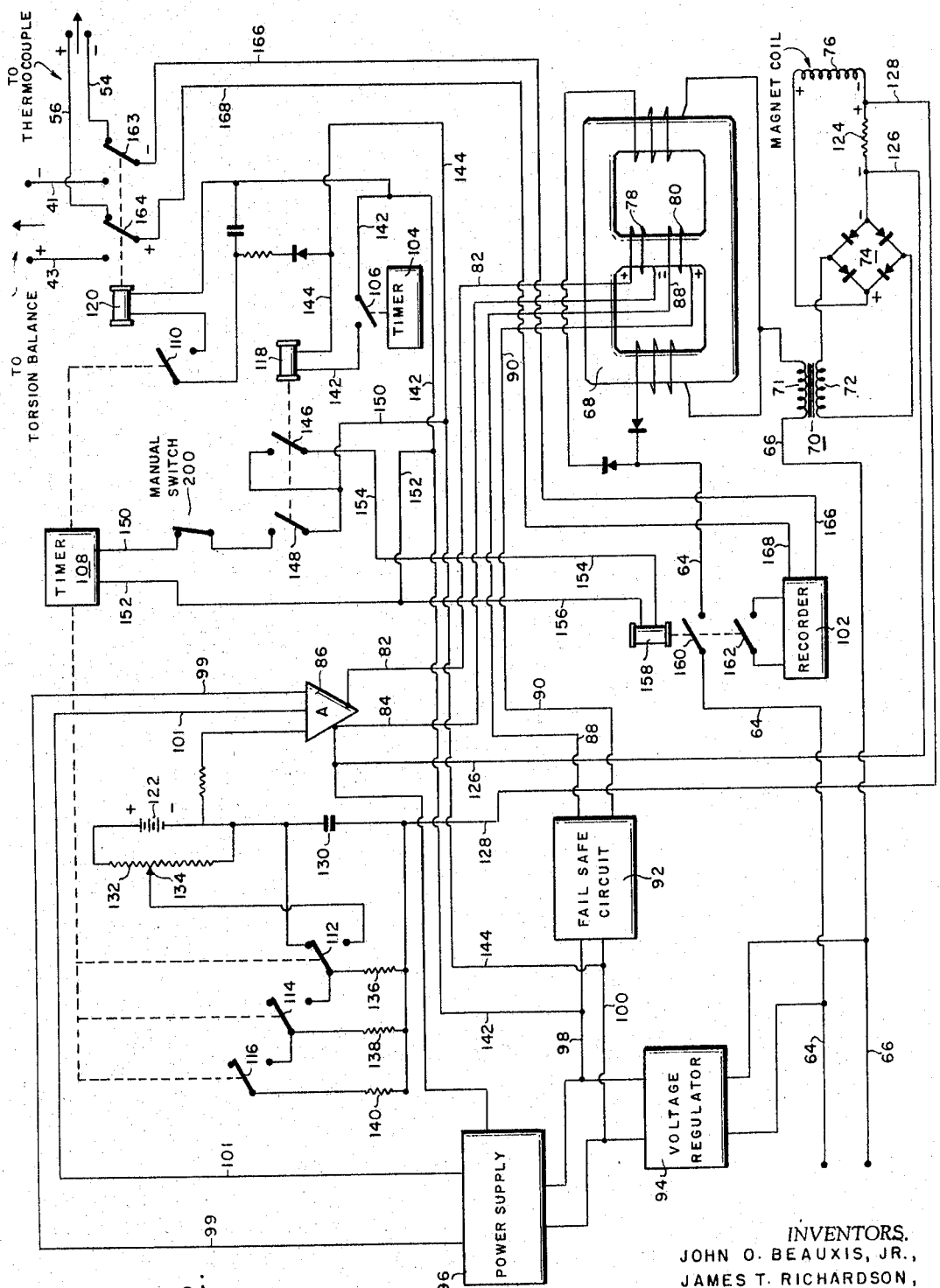

3,299,348
MAGNETIC SUSCEPTIBILITY MEASURING SYSTEM
John O. Beauxis, Jr., and James T. Richardson, Baytown, Tex., assignors, by mesne assignments, to Esso Research and Engineering Company, Elizabeth, N.J., a corporation of Delaware
Filed Feb. 8, 1963, Ser. No. 257,162
6 Claims. (Cl. 324—34)

This invention relates to magnetic susceptibility measurements. More particularly, this invention is an automatic magnetic susceptibility measuring system and method useful in measuring the magnetic susceptibilities of samples as a function of temperature and/or as a function of chemical activity.

It has been found that the magnetic susceptibilities of paramagnetic or ferromagnetic substances change as a function of temperature. Also, the magnetic susceptibilities of such paramagnetic or ferromagnetic materials used as catalysts bear a definite relationship to the activities of the catalysts. A typical application of a magnetic susceptibility study using this improved system and method is the study of the reduction of a metal oxide catalyst such as nickel oxide. A sample is heated to the required temperature, and hydrogen is admitted. The degree of reduction as a function of time is continuously indicated by this system.

Similar measurements may be made with other reactions such as oxidation, sulfiding, and adsorption although care must be taken not to introduce gases harmful to the weight measuring components.

Briefly, described, a weight indicator is included in this new system. Temperature-sensing means, such as thermocouples, are used for sensing the temperature of the sample on the weight indicator. An electrical circuit controls the recording of: (1) the temperature of the sample, (2) the mass of the sample, and (3) the apparent weight change of the sample caused by the application of a magnetic field to the sample. The magnetic field is automatically controlled to produce a field which goes through a programed rate of change and a constant value over fixed intervals of time.

For following the changes in magnetic susceptibility as a function of activity, the weight indicator may be enclosed in an enclosure. A gas inlet and a gas outlet are provided in the enclosure permitting the flow of gases into the enclosure for reaction with the sample in the sample holder.

The invention, as well as its many advantages, will be further understood by reference to the following detailed description and drawings in which:

FIG. 2 is an electrical schematic diagram of the power system and control circuitry;

Figures 1, 5:
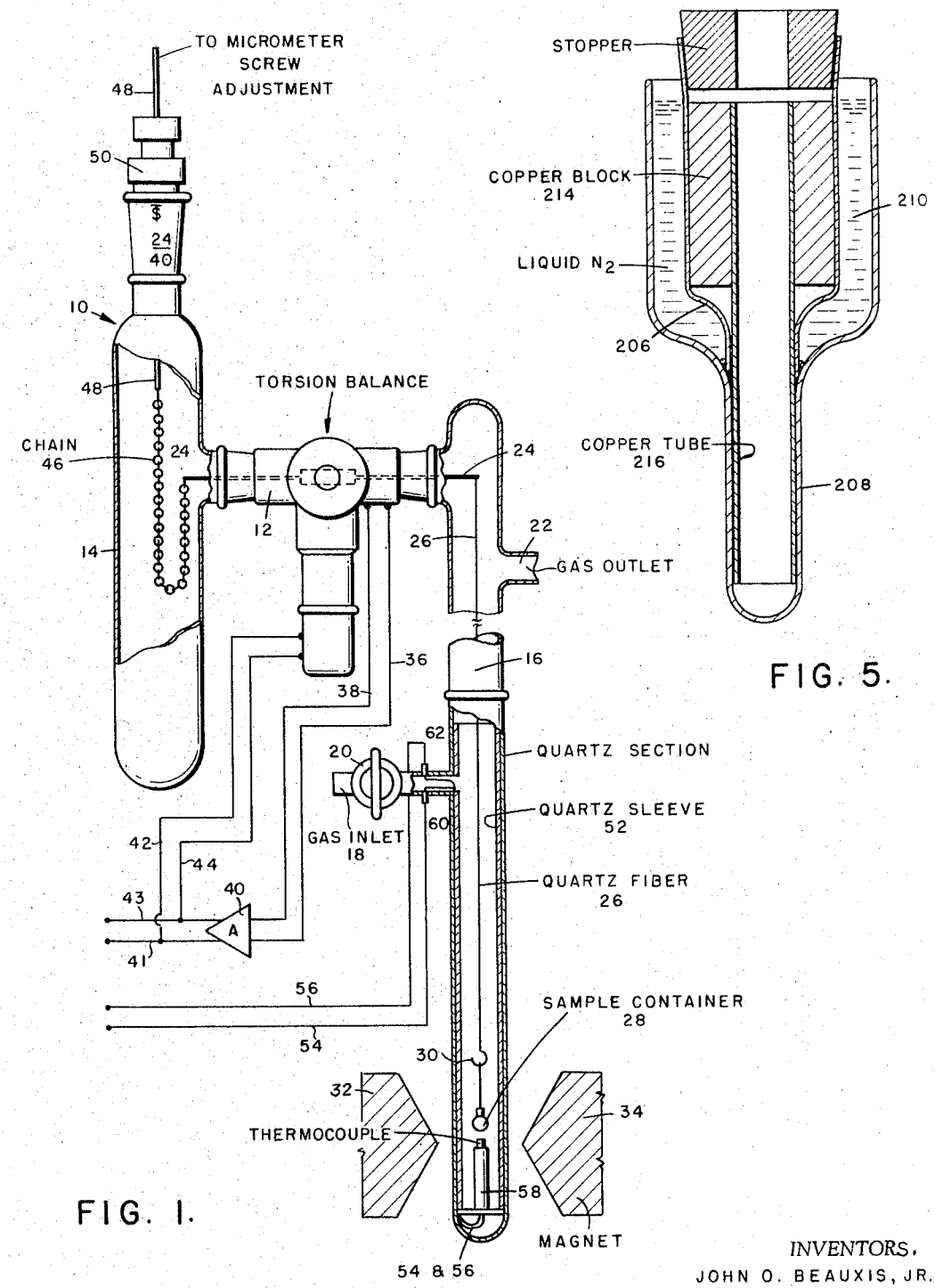
FIG. 1 is a schematic view showing a preferred mode of the present invention.
FIGS. 4 and 5 are schematic representations of means for varying the temperature of the sample.

Referring to the drawings and more particularly to FIG. 1, the weight indicator is preferably a null-type torsion balance mounted in an enclosure 10. The enclosure 10 includes a horizontal portion 12, a taring section 14, and a downwardly extending sample section 16. A gas inlet 18 controlled by valve 20 is connected to the sample section 16 of the enclosure 10. A gas outlet 22 leads from the sample section 16 of the enclosure 10. Gas outlet 22 may, for example, be connected to a vacuum system.

The technique of measuring magnetic susceptibility used is preferably a technique involving the measurement of the apparent weight change of a sample placed in a heterogenous magnetic field. The formula used to determine the magnetic susceptibility is:

$$g\Delta m = XmH\,dH/dx$$

wherein
$m$ = mass of the sample
$\Delta m$ = apparent weight change
$g$ = gravitational constant
$X$ = magnetic susceptibility, e.m.u./g.
$H$ = magnetic field, oersted
$dH/dx$ = magnetic field gradient perpendicular to the magnetic field The torsion beam 24 is located in the horizontal portion 12. A quartz fiber 26 is connected to one end of the torsion beam 24 and supports a spherical quartz sample container 28. The length of the supporting quartz fiber 26 and the container hook 30 is constant so that the sample in the sample container 28 is always positioned at the same point in the gap between magnet poles 32 and 34.

The null-type torsion balance may, for example, be a Sartorius Electronic II vacuum model recording microtorsion balance distributed by C. A. Brinkmann and Company, Inc. It is a null instrument in the sense that the sample is always maintained at the same position by a restoring force. The restoring current is fed through lines 36 and 38 to an amplifier 40. The output from the amplifier 40 is fed through lines 41 and 43 to a recorder and also fed through lines 42 and 44 to a magnetic coil (not shown) which maintains the position of the torsion beam 24 constant.

The taring device includes a gold-plated chain 46 suspended from one end of the torsion beam 24. The length of the chain 46 below the suspension point is adjusted by moving the shaft 48 extending through the vacuum seal 50. The shaft 48 is attached to a micrometer screw arrangement so that precise adjustments are possible.

The lower part of the sample portion 16 is preferably made of quartz and has an inner sleeve 52 also made of quartz. This allows the sample to be heated to high temperatures and a stream of gas passed through the system. Thermocouple wires 54 and 56 pass through the annular space between the inner tube 52 and outer tube 16. The thermocouple junction is supported by suitable ceramic spacers 58 close to the sample. The thermocouple wires 54 and 56 enter through small tubes 60 and 62, respectively, in the side arm 18 and may be sealed with wax. A copper-constantan thermocouple may be used for low temperature, and a platinum 10% Pt–Rh thermocouple is used for high temperature measurements.

The control circuits and power supply are schematically shown in FIG. 2. The power system consists of an electromagnetic circuit including the A.C. input leads 64 and 66, saturable reactor 68, isolation transformer 70, and bridge rectifier 74, all of which furnish power to the coil 76 of the magnet.

The magnitude of the A.C. current through the saturable reactor 68 is controlled by the D.C. current through the control windings 78 and 80. Control winding 78 is connected through lines 82 and 84 to the amplifier 86. Control winding 80 is connected through lines 88 and 90 to a fail safe circuit 92. The fail safe circuit 92 provides a D.C. current $I_f$, which magnetizes the core of the saturable reactor 68 in an opposite direction to that of the current $I_p$ from the amplifier 86. The net control current $I_c$ is the difference $I_f - I_p$. The fail safe circuit 92 consists of a transformer and silicon rectifiers which provide a constant value of $I_f$. The components are operated at less than their rated values, thus minimizing the possibility of failure. The use of two control windings not only eliminates the necessity for full output of the control amplifier 86 when magnet power is not needed, but also provides the fail safe current $I_f$ in the event of amplifier failure.

The output of the amplifier 86 controls the output of the saturable reactor 68. The amplifier 86 is itself controlled by its input. The input to the amplifier 86 is controlled by an electrical control circuit including a timing system to be subsequently described.

The isolation transformer coils 71 and 72 provide a one-to-one power transformer which is installed in the circuit to isolate the coil 76 from the rest of the circuit, thereby reducing the effects of high voltage surges that may be generated by the coil. The bridge rectifier 74 converts the A.C. output to D.C. for final application to the magnet coil 76.

A voltage regulator 94 is connected across input leads 64 and 66 and to a power supply 96, and supplies power to the fail safe circuit 92 through lines 98 and 100. Power supply 96 also supplies power to amplifier 86 through lines 99 and 101.

The remainder of the circuits shown in FIG. 2 is used to control the recording on recorder 102 of the temperature of the sample, the mass $m$ and the apparent weight change $\Delta m$ of the sample caused by the application of the magnetic field. The control circuits include a first timer 104 which controls switch 106 and a second timer 108 which controls switches 110, 112, 114, and 116. Switch 106 controls the position of the contacts of relay 118. Switch 110 controls the position of the contacts of relay 120.

The input to the amplifier 86 is the difference between the voltage applied from the battery 122 across an RC network and the feedback voltage generated by the current through resistor 124 and fed back through lines 126 and 128. The RC network consists of condenser 130, resistor 132, and resistors 136, 138, and 140. The amplitude of the current applied to the magnet coil 76 is controlled by adjusting the position of tap 134 along the resistor 132, and the rise time and peak interval are controlled by the timer 108 which operates switches 112, 114, and 116 in the proper sequence.

The input $E_e$ to amplifier 86 can be represented by the equation:

$$E_e = E_R - E_c$$

where $E_R$ = the reference voltage
$E_c$ = voltage across precision resistor 124

Hence, any deviation of $E_c$ from a predetermined value results in corrective action being taken by the amplifier 86 and saturable reactor 68 to instantaneously return the magnet current to the correct value. The system maintains $E_e$ constant, such that any change of $E_R$ results in a change in magnet current and corresponding change in $E_c$. Should $E_c$ change in value, due to line voltage fluctuation or other causes, the system increases or decreases the magnet current accordingly.

The cycle is initiated by the closing of switch 106 by timer 104. Timer 104 may be an instantaneous reset timer which is used to vary the interval between cycles from say 2 to 58 minutes.

The closing of switch 106 completes the circuit across lines 142 and 144 connected to lines 98 and 100, respectively, thus energizing relay 118. The energizing of relay 118 operates switch contacts 146 and 148. The closing of switch 148 causes current to be fed to the timer 108 through lines 150 and 152 connnected to lines 144 and 142, respectively. The closing of switch 146 completes a circuit across lines 154 and 156 to energize the relay 158. The energizing of relay 158 results in the closing of relay contacts 160 and 162, thereby starting the motor of recorder 102 and providing power through lines 64 and 66 to the saturable reactor 68.

Figure 3:
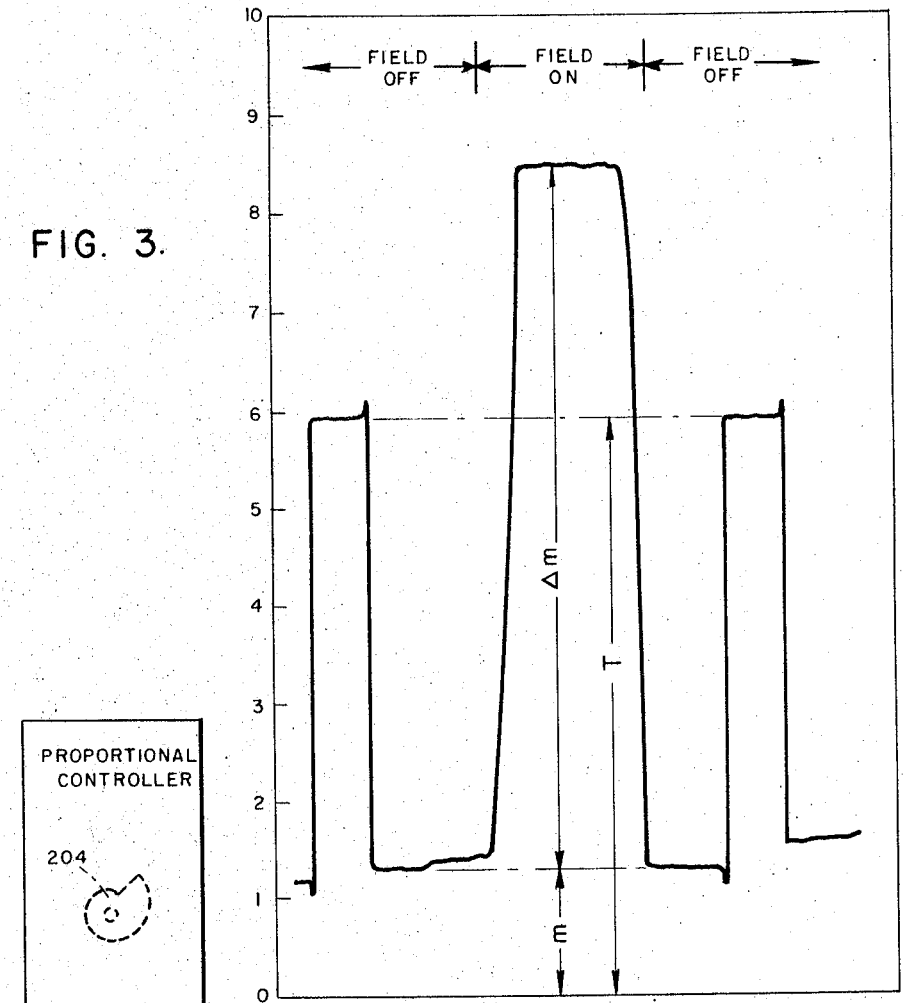
FIG. 3 shows a typical record obtained by the new system and method.

When the motor of recorder 102 is operated, the position of contacts 163 and 164 of relay 120 is as shown in FIG. 2. The thermocouples are connected to the recorder 102 through lines 166 and 168. The temperature indicating current fed through lines 54 and 56 (see FIG. 1) is thus recorded on the chart of recorder 102 (see FIG. 3). Thereafter, the switch 110 is operated by timer 108 to energize relay 120, thereby moving relay contacts 163 and 164 into position to record the restoring current from the torsion balance. Thus, the restoring current from the torsion balance is fed through lines 41 and 43 and then through lines 166 and 168, respectively, to recorder 102 indicating the weight, $m$, of the sample as shown in FIG. 3. After a brief pause, for example, 15 seconds, switch 112 is operated by timer 108, thereby switching resistor 136 in series with resistor 132. This allows voltage to build across the condenser 130 which loads the amplifier 86 and drives the saturable reactor 68. A short time later, say 7 seconds thereafter, switch 114 is operated by timer 108 to place resistor 138 in parallel with resistor 136 allowing the voltage across condenser 130 to increase at a faster rate. After a third pause, say 8 seconds later, switch 116 is operated by timer 108 to place resistor 140 in parallel with resistors 132, 136, and 138. The condenser 130 is now at the full voltage level which has been selected by the position of voltage tap 134. The peak value of the current is now flowing through magnet coil 76 and is maintained for a predetermined time. Thus, the apparent weight change ($\Delta m$) is indicated on the chart of recorder 102 (see FIG. 3).

After $\Delta m$ has been indicated, timer 108 sequentially releases switch 116, switch 114, and switch 112. The sample weight, $m$, is again recorded, at which time switch 110 is operated by timer 108, and the thermocouples are again switched to the recorder 102. At the end of the predetermined cycle, timer 104 opens switch 106 stopping the motor of recorder 102 and disconnecting the power to the reactor 68. The control circuit is then inactive until switch 106 is again closed by timer 104.

Switch 200 in line 150 leading to timer 108 permits the operator to interrupt the cycle to allow extended measurement at some particular part of the operation. This may, for example, be desirable in order to make extended observations of the peak value of $\Delta m$.

Figure 4:
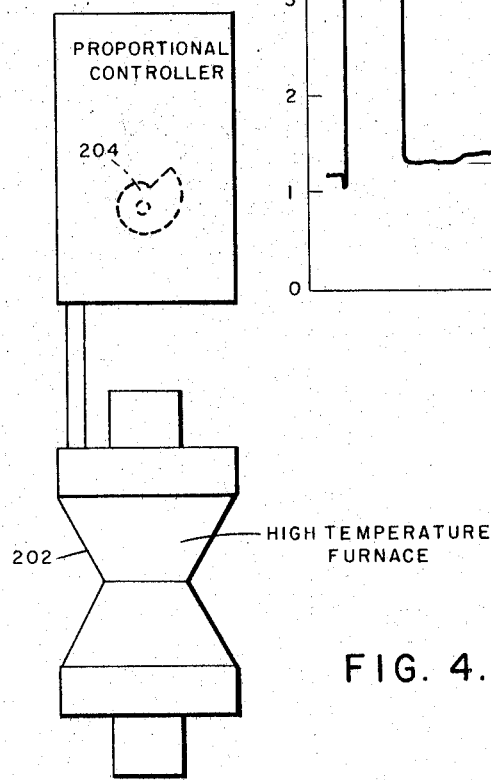

For high temperature measurements, the furnace shown in FIG. 4 may be used. High temperatures are produced by a current fed to noninductively wound resistance wires on an Alundum tube (not shown). The insulation 202 is shaped to accommodate the pole pieces of the magnets 32 and 34.

A second thermocouple (not shown) may be situated between the sample section of tube 16 of FIG. 1 and the furnace wall 202 of FIG. 4 and used for control purposes. The temperature controller may be a programed proportional instrument such as manufactured by West Instrument Corportion, model JSBG. It may be used to maintain the temperature of the sample at some fixed value or to raise the temperature at a selected rate. By using a suitably designed cam 204, the temperature may be raised from 25° C. to 500° C. in 8 hours. The interval on timer 104 may be set to give as many measuring points over this temperature range as desired.

The equipment for low temperature control is shown in FIG. 5. FIG. 5 shows an appropriately shaped and silvered Pyrex Dewar with a central section 206 sealed to the inner wall of the tubular bottom 208. Liquid nitrogen is contained in the annular space 210. The inner section holds a copper block 214 through which extends a copper tube 216. The quartz sample section of tube 16 of the null-type torsion balance fits into the copper tube 216.

When liquid nitrogen is placed in the annular space 210, the sample takes approximately 4 hours to cool to −196° C. This is a slow enough rate to allow accurate measurements to be made at some fixed interval depending on the number of points required.

In operation, a weighed amount of the sample is measured into the quartz container 28. The chain 46 is then adjusted so that the recorder 102 reads some reference value, and the micrometer reading of the chain 46 is noted. The cycle is then activated by the timing devices. From the thermocouple, balance with magnetic field off, and balance with magnetic field on readings, the temperature $m$ and $\Delta m$ are calculated, respectively.

If used, for example, for the study of the reduction of metal oxide catalysts, the sample is heated to the required temperature; and hydrogen gas is admitted to the system through gas inlet 18. When the reduction is slow, the apparatus is cycled giving a measure of the weight loss and degree of reduction (from the increase of the magnetic peak) as a function of time. If the reduction is fast, the cycle may be stopped by opening switch 200 of FIG. 2 in the middle of the magnetic peak; and a continuous curve representative of the amount of reduction is traced by the recorder.

This system and method allows completely automatic measurements of weight, magnetic susceptibility, and temperature over a wide temperature range. The equipment requires a minimum amount of the operator's attention after the initial starting procedure. The recording feature of the instrument provides a means of following the kinetics of chemical reactions involving changes in the magnetic state of a solid.

We claim:

1. A system for making magnetic susceptibility measurements of a sample comprising: a weight indicator for the sample; temperature-sensing means for sensing the temperature of the sample; an electromagnetic circuit for subjecting the sample to a magnetic field, said electromagnetic circuit having magnet current control means including a reference voltage means and a feedback voltage means responsive to changes in reference voltages to maintain the difference between the reference voltage and feedback voltage constant and wherein the reference voltage means includes time-operated switches for controlling the rise time and peak interval of the current applied to the magnet; a recorder; and an electrical control circuit including timing means and switching means controlled by said timing means for sequentially recording the temperature of the sample, the mass of the sample, and the apparent weight change of the sample caused by the magnetic field at the peak interval of the current applied to the magnet.

2. A system for making magnetic susceptibility measurements of a sample comprising: an enclosure; a null-type torsion balance in the enclosure and including a sample holder; a gas inlet and a gas outlet for flowing gases into said enclosure and contacting a sample in the sample holder with the gases; an electromagnetic circuit for subjecting the sample to a magnetic field and including A.C. power lines, a saturable reactor across said A.C. power lines, a rectifier for converting the A.C. signal from the saturable reactor into a D.C. signal, and a pair of spaced apart magnet poles for receiving the D.C. signal and applying a magnetic field to the sample, and wherein the magnitude of the A.C. current from the saturable reactor is controlled by magnet current control means including a reference voltage means and a feedback voltage means responsive to changes in reference voltages to maintain the difference between the reference voltage and feedback voltage constant and wherein the reference voltage means includes time-operated switches for controlling the rise time and peak interval of the current applied to the magnet; a recorder; and an electrical control circuit including timing means and switching means controlled by said timing means for sequentially recording the temperature of the sample, the mass of the sample, and the apparent weight change of the sample caused by the magnetic field at the peak interval of the current applied to the magnet.

3. A system in accordance with claim 2 wherein the magnitude of the A.C. current from the saturable reactor is controlled by two control windings, and means are included in the electrical control circuit for passing D.C. currents through the control windings in opposite directions, thus providing a net control current.

4. A system for making magnetic susceptibility measurements of a sample comprising: an enclosure; a null-type torsion balance in the enclosure and including a sample holder; temperature-sensing means for sensing the temperature of the sample; an electromagnetic circuit for subjecting the sample to a magnetic field, said electromagnetic circuit having magnet current control means including a reference voltage means and a feedback voltage means responsive to changes in reference voltages to maintain the difference between the reference voltage and feedback voltage constant and wherein the reference voltage means includes time-operated switches for controlling the rise time and peak interval of the current applied to the magnet; and a recorder for recording the apparent weight change of the sample caused by the magnetic field at the peak interval of the current applied to the magnet.

5. A system in accordance with claim 4 wherein the enclosure has a gas inlet and a gas outlet for flowing gases into said enclosure and contacting a sample in the sample holder with the gas.

6. A system in accordance with claim 4 wherein a taring device is attached to one end of the torsion balance.

References Cited by the Examiner

Knowlton, A. F.: Standard Handbook for Electrical Engineers, McGraw-Hill Co., 8th ed., 1949, sec. 21–110.

Robertson, R. F. S.: "An Automatic Magnetic Balance for the Study of Ferromagnetic Materials," The Review of Scientific Instruments, vol. 22, No. 3, March 1951, pages 146–152.

The Review of Scientific Instruments, vol. 23, No. 1, January 1952, "An Automatically Recording Magnetic Balance" (pp. 17–21), by Joseph D. Eisler et al.

The Review of Scientific Instruments, May 1954, "Automatically Recording Magnetic Balance" (pages 516–517) by Tokutaro Hirove et al.

Hedgcock, F. T.: "Susceptibility Servo-Balance for Measurements on Metals of Extremely Low Resistivities," The Review of Scientific Instruments, vol. 31, No. 5, April 1960, pages 390–394.

Chen, W. K.: "Transducer-Operated Balance for Making Magnetic Susceptibility Measurements," The Review of Scientific Instruments, vol. 31, No. 10, October 1960, pages 1157–1158.

Crow, L. R.: Saturating Core Devices, The Scientific Book Publishing Co., Indiana, 1956, pages 74–75.

RUDOLPH V. ROLINEC, *Primary Examiner.*

RICHARD B. WILKINSON, F. A. SEEMAR, R. J. CORCORAN, *Assistant Examiners.*